United States Patent
Hamzah et al.

(10) Patent No.: US 7,327,678 B2
(45) Date of Patent: Feb. 5, 2008

(54) METRO ETHERNET NETWORK SYSTEM WITH SELECTIVE UPSTREAM PAUSE MESSAGING

(75) Inventors: Mohamed Nizam Mohamed Hamzah, Shanghai (CN); Girish Chiruveth, Plano, TX (US)

(73) Assignee: Alcatel Lucent, Paris (FR)

( * ) Notice: Subject to any disclaimer, the term of this patent is extended or adjusted under 35 U.S.C. 154(b) by 944 days.

(21) Appl. No.: 10/626,066

(22) Filed: Jul. 24, 2003

(65) Prior Publication Data

US 2004/0095882 A1  May 20, 2004

Related U.S. Application Data

(60) Provisional application No. 60/419,756, filed on Oct. 18, 2002.

(51) Int. Cl.
*H04J 1/16* (2006.01)
(52) U.S. Cl. ............... 370/230; 370/235; 370/401; 370/412
(58) Field of Classification Search ............ 370/229, 370/230, 232, 235
See application file for complete search history.

(56) References Cited

U.S. PATENT DOCUMENTS 5,838,922 A * 11/1998 Galand et al. ............ 709/232
6,026,075 A *  2/2000 Linville et al. ............ 370/236

(Continued)

FOREIGN PATENT DOCUMENTS

EP  0 748 087 A1  12/1996
EP  1 079 660 A1   2/2001

OTHER PUBLICATIONS

Mark Karol, S. Jamaloddin Golestani, David Lee: "Prevention of Deadlocks and Livelocks in Lossless, Backpressured Packet Networks," IEEE INFORCOM 2000; 0-7803-5880-5/00 (pp. 1333-1342).

(Continued)

*Primary Examiner*—Ricky Q. Ngo
*Assistant Examiner*—Dady Chery
(74) *Attorney, Agent, or Firm*—Bobby D. Slaton; Jessica W. Smith; Galasso & Associates

(57) ABSTRACT

A network system (10). The system comprises a first network node ($MN_x$), and that node comprises an input ($30_{IN}$) for receiving a packet, and the node also comprises a buffer ($30_{LC}$), coupled to the input and for storing the packet. The first network node also comprises circuitry (50) for detecting when a number of packets stored in the buffer exceeds a buffer storage threshold and circuitry, responsive to a detection by the circuitry for detecting that the number of packets stored in the buffer exceeds the buffer storage threshold, for issuing a pause message (60) along an output to at least a second network node. The pause message indicates a message ingress address ($60_2$) and a message egress address ($60_2$), where that message ingress address and the message egress address correspond to a network ingress address and a network egress address in a congestion-causing packet received by the first network node. The pause message commands the second network node to discontinue, for a period of time, transmitting to the first network node any packets that have the message ingress address and the message egress address.

15 Claims, 3 Drawing Sheets

U.S. PATENT DOCUMENTS

| | | | |
|---|---|---|---|
| 6,035,333 A * | 3/2000 | Jeffries et al. | 709/224 |
| 6,192,028 B1 * | 2/2001 | Simmons et al. | 370/229 |
| 6,405,258 B1 * | 6/2002 | Erimli et al. | 709/235 |
| 6,912,226 B2 * | 6/2005 | De Cnodder et al. | 370/412 |
| 2002/0087723 A1 | 7/2002 | Williams et al. | |
| 2004/0136359 A1 * | 7/2004 | Ivancovsky et al. | 370/352 |

OTHER PUBLICATIONS

W. Noureddine, F. Tobagi: "Selective Back-Pressure In Switched Ethernet LANS"; Global Telecommunications Conference—Globecome '99, 0-7803-5796-5/99, (pp. 1256-1263).

* cited by examiner

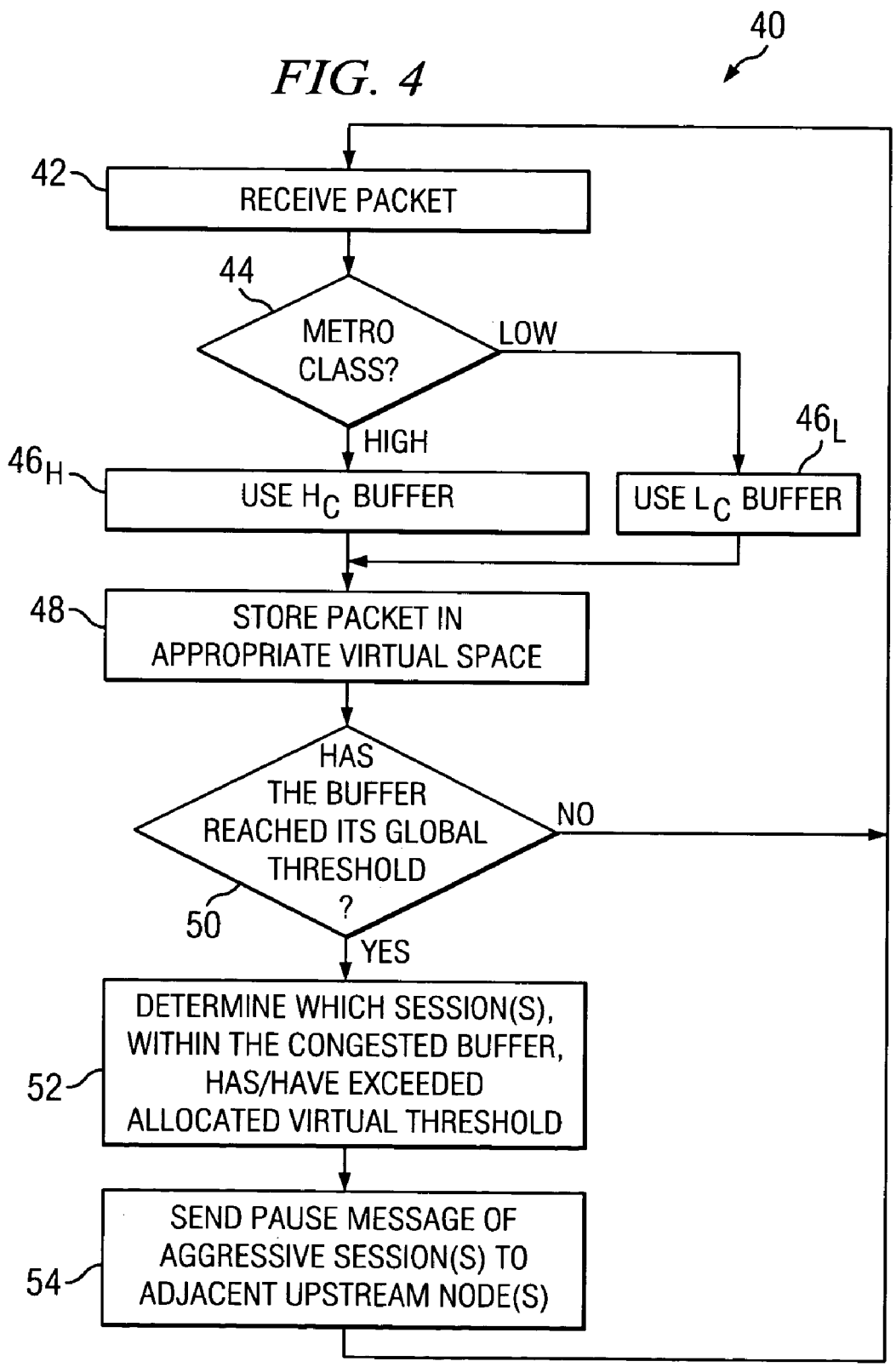

METRO ETHERNET NETWORK SYSTEM WITH SELECTIVE UPSTREAM PAUSE MESSAGING

CROSS-REFERENCES TO RELATED APPLICATIONS

This application claims the benefit, under 35 U.S.C. §119(e)(1), of U.S. Provisional Application No. 60/419,756, filed Oct. 18, 2002, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to a Metro Ethernet network system in which its nodes transmit upstream pause messaging to cause backpressure for only selected upstream switches.

Metro Ethernet networks are one type of network that has found favor in various applications in the networking industry, and for various reasons. For example, Ethernet is a widely used and cost effective medium, with numerous interfaces and capable of communications and various speeds up to the Gbps range. A Metro Ethernet network is generally a publicly accessible network that provides a Metro domain, typically under the control of a single administrator, such as an Internet Service Provider ("ISP"). Metro Ethernet may be used to connect to the global Internet and to connect between geographically separated sites, such as between different locations of a business entity. Also, the Metro Ethernet network is often shared among different customer virtual local area networks ("VLAN"), where these networks are so named because a first VLAN is unaware of the shared use of the Metro Ethernet network by one or more additional VLANs. In this manner, long-standing technologies and infrastructures may be used to facilitate efficient data transfer.

A Metro Ethernet network includes various nodes for sake of routing traffic among the network, where such nodes include what are referred to in the art as switches or routers and are further distinguished as edge nodes or core nodes based on their location in the network. Edge nodes are so named as they provide a link to one or more nodes outside of the Metro Ethernet network and, hence, logically they are located at the edge of the network. Conversely, core nodes are inside the edges defined by the logically perimeter-located edge nodes. In any event, both types of nodes employ known techniques for servicing traffic arriving from different nodes and for minimizing transient (i.e., short term) congestion at any of the nodes. Under IEEE 802.3x, which is the IEEE standard on congestion control, and in the event of such congestion, a node provides "backpressure" by sending pause messages to all upstream Metro Ethernet nodes, that is, those that are transmitting data to the congestion-detecting node. Such congestion is detected by a node in response to its buffering system reaching a threshold, where once that threshold is reached and without intervention, the node will become unable to properly communicate its buffered packets onward to the link extending outward from that node. In response to such detection, the node transmits a pause message to every upstream adjacent node whereby all such adjacent nodes are commanded to cease the transmission of data to the congested node, thereby permitting the congested node additional time to relieve its congested state by servicing the then-stored data in its buffering system.

Another approach also has been suggested for responding to congestion in Metro Ethernet networks. In "Selective Backpressure in Switched Ethernet LANs", by W. Noureddine and F. Tobagi, published by Globecom 99, pp. 1256-1263, and hereby incorporated herein by reference, packets directed to a same Metro Ethernet network destination MAC address are stored in a specific output buffer within a node. When the packet occupancy within such a buffer reaches a threshold limit, backpressure is applied to all the adjacent upstream nodes that have a buffer containing packets of that corresponding MAC destination. However, such an approach has drawbacks. For example, the approach is non-scalable, as there should be n number of buffers (or buffer space) in a node that switches traffic to n different MAC destinations. The number of buffers required also increases when traffic-class is introduced. Also if one of the buffers is not optimally utilized, other traffic with a different MAC destination is not able to utilize the unused resources in the sub-optimal buffer(s), thereby leading to wastage. Further, each session capacity requirement and path can vary with time as well as network condition and, hence, there is no provision for local Max-Min fairness. Particularly, in this existing approach, there is no scheme for differentiation among sessions and the traffic of each of the sessions may vary with time. Some sessions may be idle and some may become active for a period of time and so on. Thus, there is a need for an "arbitrator" to fairly allocate bandwidth for the status of the sessions. Max-Min fairness is an outcome of one such arbitrator for bandwidth. Under Max-Min fairness, the session that requires the least bandwidth is first satisfied/allocated by the arbitrator and the procedure is repeated recursively for the remaining sessions until the available capacity is shared.

Two additional documents also suggest response to congestion in Metro Ethernet networks. Specifically, in "A Simple Technique That Prevents Packet Loss and Deadlocks in Gigabit Ethernet", by M. Karol, D. Lee, S. J. Golestani, published by ISCOM 99, pp. 26-30, and in "Prevention of Deadlocks and Livelocks in Lossless, Backpressure Packet Networks", by M. Karol, S. J. Golestani, D. Lee, and published by INFOCOM 2000, pp. 1333-1342, and hereby incorporated herein by reference, a buffer is described that is shared by more than one session, where a session is defined as a packet or packets communicated between a same ingress and egress Metro Ethernet network edge node (i.e., as identifiable by the addresses in the MAC-in-MAC addressing scheme used for Metro Ethernet networks). The buffer is divided into segments and each segment is given an identification number. Each segment is allowed to store packets with different MAC addresses at the same time, but an arriving packet can only be stored in a segment that currently has packets with the same MAC addresses. If a segment fills to its limit, the node disallows any arriving packets from being stored not only in the congested segment but also other segments whose identification number is smaller than the congested one. At the same time, a backpressure message is sent to every adjacent upstream node. The upstream-nodes will then temporarily stop serving all buffer segments that have identification number similar or smaller than the downstream congested-node segment. Thus, the upstream node is prevented not only from transmitting to the segment that was filled, but also to other segments as well (i.e., those with a smaller identification code). These segments also will be temporarily prevented from accepting any arriving packets. These approaches do not determine the source that causes the congestion. Hence, there is a possibility that backpressure is applied to sources that are not causing the congestion, which is unfair in that those sources are penalized (i.e., via the cessation imposed by the backpressure) even though they are not the cause of the congestion. Further, the size of each segment is also rigid, that is, the number of packets that can be stored within a segment is fixed. Still further, the congestion mechanism is inefficient in that it is always triggered by the state of any one segment, even if the total packet occupancy in the buffer space, including potentially numerous other segments, has not reached a congestion state. Lastly, this approach has no provision for multi class traffic.

In view of the above, there arises a need to address the drawbacks of the prior art, as is accomplished by the preferred embodiments described below.

BRIEF SUMMARY OF THE INVENTION

In the preferred embodiment, there is a network system. The system comprises a first network node, and that node comprises an input for receiving a packet, and the node also comprises a buffer, coupled to the input and for storing the packet. The first network node also comprises circuitry for detecting when a number of packets stored in the buffer exceeds a buffer storage threshold and circuitry, responsive to a detection by the circuitry for detecting that the number of packets stored in the buffer exceeds the buffer storage threshold, for issuing a pause message along an output to at least a second network node. The pause message indicates a message ingress address and a message egress address, where that message ingress address and the message egress address correspond to a network ingress address and a network egress address in a congestion-causing packet received by the first network node. The pause message commands the second network node to discontinue, for a period of time, transmitting to the first network node any packets that have the message ingress address and the message egress address.

Other aspects are also described and claimed.

3 illustrates a block diagram of various aspects of each Metro node in system 10.

Figure 3:
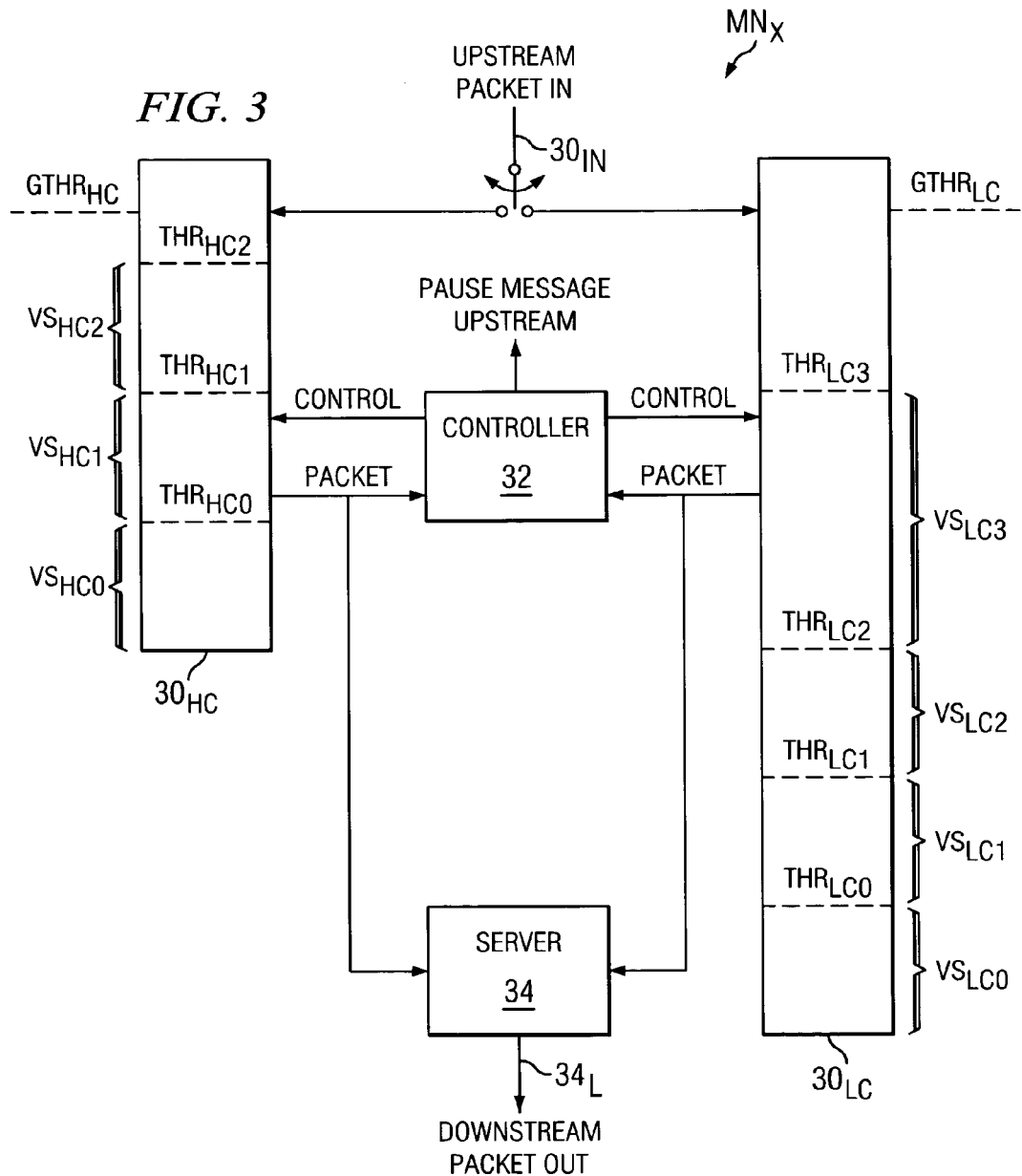

FIG. 4 further illustrates the operation of node $MN_x$ of FIG. 3 through use of a flow chart depicting a method 40.

Figure 5:
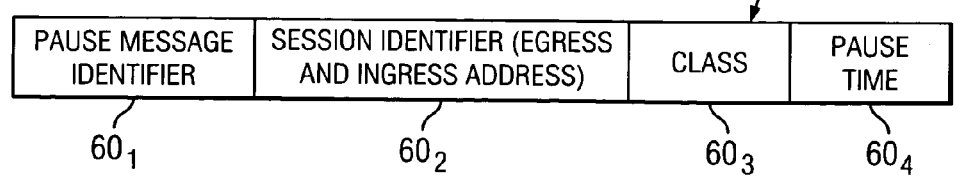

FIG. 5 illustrates a preferred form of a pause message.

DETAILED DESCRIPTION OF THE INVENTION

Figure 1:
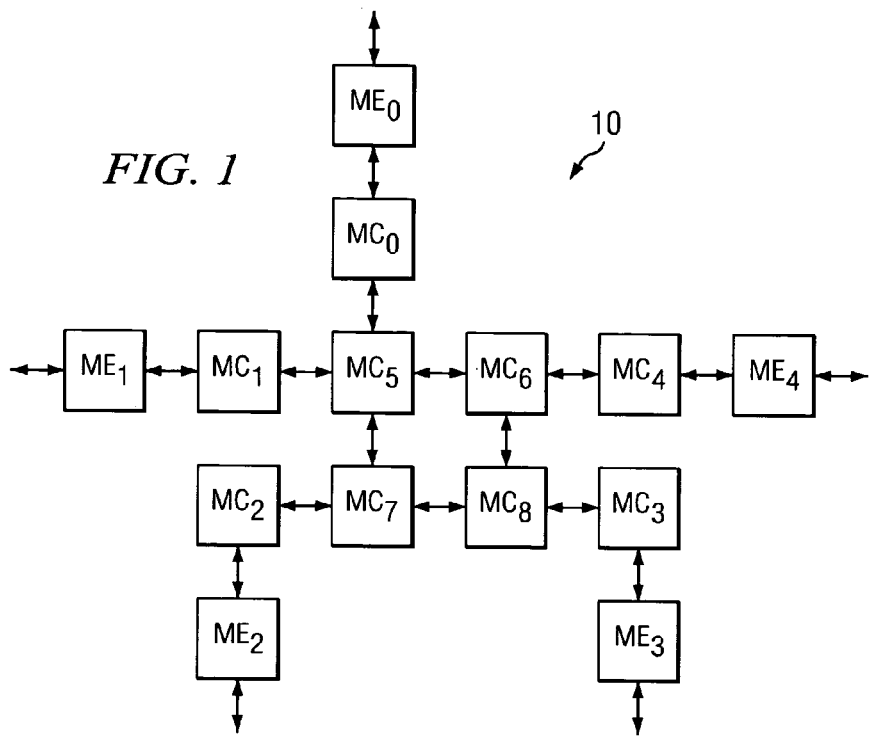
FIG. 1 illustrates a block diagram of a network system 10 into which the preferred embodiments may be implemented.

FIG. 1 illustrates a block diagram of a system 10 into which the preferred embodiments may be implemented. System 10 generally represents a Metro Ethernet network that includes a number of Metro nodes. As introduced earlier in the Background Of The Invention section of this document, such nodes are typically described as edge nodes or core nodes based on their location in the network; by way of example, system 10 includes five Metro edge nodes $ME_0$ through $ME_4$ and nine Metro core nodes $MC_0$ through $MC_8$. These nodes include various aspects as known in the art, such as operating to send packets as a source or receive packets as a destination. Further, and as also known in the art, system 10 is typically coupled with stations or nodes external to system 10, such as may be implemented in the global Internet or at remotely located networks, such as at different physical locations of a business entity. Thus, those external nodes can communicate packets with system 10; for example, one such node external from but coupled to, Metro edge node $ME_1$ can communicate a packet to Metro edge node $ME_1$. In this case, Metro edge node $ME_1$ is referred to as an ingress node because in this example it is the location of ingress into system 10. Further, once that packet is so received, it may be forwarded on through various paths of system 10, and ultimately it will reach one of the other edge nodes and then pass outward of system 10, such as to another external node. This latter edge node, that communicates the packet outward, is referred to as the egress node because in this example it is the location of egress out of system 10. One skilled in the art should appreciate that the number of nodes shown in FIG. 1 is solely by way of example and to simplify the illustration and example, where in reality system 10 may include any number of such nodes. Further, the specific connections shown also are by way of example, and are summarized in the following Table 1, which identifies each node as well as the other node(s) to which it is connected.

TABLE 1

| node | connected nodes |
|---|---|
| $ME_0$ | External node(s) not shown; $MC_0$ |
| $ME_1$ | External node(s) not shown; $MC_1$ |
| $ME_2$ | External node(s) not shown; $MC_2$ |
| $ME_3$ | External node(s) not shown; $MC_3$ |
| $ME_4$ | External node(s) not shown; $MC_4$ |
| $MC_0$ | $ME_0$; $MC_5$ |
| $MC_1$ | $ME_1$; $MC_5$ |
| $MC_2$ | $ME_2$; $MC_7$ |
| $MC_3$ | $ME_3$; $MC_8$ |
| $MC_4$ | $ME_4$; $MC_6$ |
| $MC_5$ | $MC_0$; $MC_1$; $MC_6$; $MC_7$ |
| $MC_6$ | $MC_4$; $MC_5$; $MC_8$ |
| $MC_7$ | $MC_2$; $MC_5$; $MC_8$ |
| $MC_8$ | $MC_3$; $MC_6$; $MC_7$ |

While the preceding discussion represents system 10 as known in the art, the remaining discussion includes various aspects that improve traffic performance across system 10 according to the scope of the preferred inventive embodiments.

Figure 2:
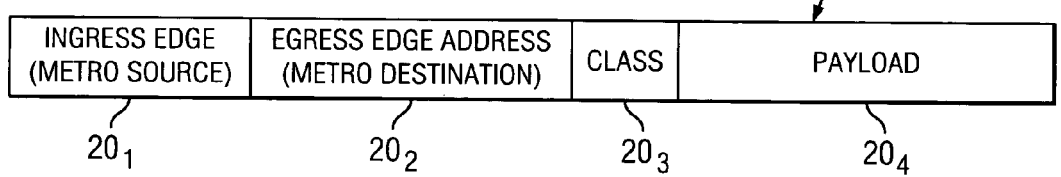
FIG. 2 illustrates the general form of each packet 20 that passes through system 10.

FIG. 2 illustrates the general form of each packet 20 that passes through system 10, according to the preferred embodiment. Packet 20 includes four fields. A first field $20_1$ indicates the address of the ingress edge node; in other words, that address is the address of the first node that encountered packet 20 once packet 20 was provided by an external source to system 10; this address is also sometimes referred to as a Metro source address. A second field $20_2$ indicates the address of the egress edge node for packet 20. In this regard, note that Metro Ethernet networks provide sufficient controls such that when a packet is received external from the network, it includes a source and destination address as relating to nodes external from the network; in response and in order to cause the packet ultimately to be directed to the packet-specified destination address, the ingress edge node determines a desired egress edge node within system 10 such that once the packet arrives at that egress node, it can travel onward to the destination address. Then, the ingress edge node locates within packet 20 both its own address, shown as field $20_1$, as well as the egress edge node address, shown as field $20_2$. Continuing with FIG. 2, a third field $20_3$ is included to designate the packet as pertaining to a given class. Class information as used in Metro Ethernet networks are still being developed, but at this point it may be stated that they represent a manner of giving different priority to different packets based on the packet's class as compared to the class of other packets. Lastly, packet 20 includes a payload field $20_4$. Payload field $20_4$ includes the packet as originally transmitted from the external node to system 10; note, therefore, that this packet information includes the user data as well as the originally-transmitted external source address and destination address, where those addresses are directed to nodes outside of system 10. Accordingly, packet 20 includes two sets of addresses, one (in field $20_4$) pertaining to the source and destination node external from system 10 and the other (in fields $20_1$ and $20_2$) identifying the ingress and egress edge nodes. This technique may be referred to as encapsulation and with respect to the addressing in the preferred embodiment may be referred to as MAC-in-MAC encapsulation in that there is one set of MAC addresses encapsulated within another set of MAC addresses. Lastly, note that when packet 20 reaches its egress edge node $ME_x$, that node strips fields $20_1$, $20_2$, and $20_3$ from the packet and then forwards, to the destination address in payload field $20_4$, the remaining payload field $20_4$ as the entirety of the packet. Thus, upon receipt of the final packet at a node external from system 10, the destination node is unaware of the information previously provided in fields $20_1$, $20_2$, and $20_3$.

FIG. 3 illustrates a block diagram of various aspects of the preferred embodiment as included in each Metro node in system 10, that is, in either an edge node or a core node and, thus, in FIG. 3 the node is indicated generally as node $MN_x$. By way of introduction, one skilled in the art should understand that node $MN_x$ includes various other circuitry not illustrated but as will be understood to be included so as to support the functionality known in the art to be provided by such a node. In order to simplify the illustration, therefore, FIG. 3 instead illustrates those additional aspects that are particularly directed to the preferred embodiments. Further, these aspects are generally described in terms of functionality, where one skilled in the art may readily ascertain various hardware and/or software to implement such functionality.

Turning to the specifics illustrated in FIG. 3, a packet sent to node $MN_x$ is received along an input $30_{IN}$, where each such packet is then switched to one of two buffers $30_{HC}$ and $30_{LC}$, based on the class designation of the packet as is specified in field $20_3$ in FIG. 2. More particularly in the present illustration, two such classes are contemplated and are therefore referred to as a high class, corresponding to buffer $30_{HC}$, and a low class, corresponding to buffer $30_{LC}$. Each buffer $30_{HC}$ and $30_{LC}$ represents a packet storage facility that may be formed by various devices and is subject to the control of a controller 32, where various aspects of controller 32 are detailed throughout the remainder of this document and include detecting and responding to packet congestion in node $MN_x$. Each buffer is generally the same in structure and functions so as to store the respective high or low class of packets, subject to being logically partitioned by controller 32. Further, note that two buffers are shown in node $MN_x$ by way of example as corresponding to two respective packet classes, while in an alternative embodiment a different number of buffers corresponding to a different number of classes may be implemented.

Looking now to the buffers in more detail and turning first to buffer $30_{HC}$, it is shown to include three different virtual space regions $VS_{HC0}$, $VS_{HC1}$, and $VS_{HC2}$, where each such region corresponds to a different session of high class packets. For reference in connection with the preferred embodiment, the term "session" is meant to correspond to any packets having both the same ingress and egress Metro edge nodes, where recall those nodes are identified in the packet fields $20_1$ and $20_2$ as shown in FIG. 2. For example with respect to FIG. 1, if three packets are communicated from node $ME_0$ to node $ME_2$, then each of those same packets are said to belong to the same session. Thus, as those packets pass between any node connected between nodes $ME_0$ and $ME_2$, those packets are deemed to belong to the same session. Further, recall that the buffers are also separated in terms of class, so the session high class packets are directed to one buffer $30_{HC}$ while the session low class buffers are directed to another buffer $30_{LC}$. Returning then to buffer $30_{HC}$ in FIG. 3, since it includes three virtual space regions directed to high class packets, then those regions correspond to three different sessions and the high class packets thereof, that is, three sets of high class packets, where each such set has a different one of either or both of a Metro ingress or egress node address as compared to the other sets. For sake of example in the remainder of this document, therefore, assume that the three virtual space regions of buffer $30_{HC}$ correspond to the high class packets in the sessions indicated in the following Table 2.

TABLE 2

| Virtual Space | Ingress node | Egress node |
|---|---|---|
| $VS_{HC0}$ | $ME_0$ | $ME_1$ |
| $VS_{HC1}$ | $ME_1$ | $ME_2$ |
| $VS_{HC2}$ | $ME_1$ | $ME_3$ |

While Table 2 illustrates three different sessions, note there are other paths through system 10 having different possible ingress and egress nodes, such as from node $ME_3$ as an ingress node to node $ME_2$ as an egress node; however, since that combination is not shown in Table 2 and there is not a corresponding virtual space in buffer $30_{Hc}$, then it may be assumed as of the time of the example illustrated in FIG. 3 that a packet has not been received by node $MN_x$ so as to establish such a buffer space or that previously such a space had been established but it was no longer needed and therefore has been discontinued. Indeed, if such a packet is later received, then controller 32 will allocate a new virtual space for that session, while re-adjusting the allocation of one or more of the existing virtual spaces in order to allow buffer storage resources for the new session. Additionally, in the preferred embodiment, the amount of buffer space allocated to each session by controller 32 is proportional to the session's computed share of bandwidth. The share preferably is re-evaluated when there is a change in network conditions and requirements, and the computation is performed periodically for Best Effort class traffic in order to achieve Max-Min Fairness. Further, once all packets in a virtual space have been output, then the virtual space can be closed so that its resource may be available for a different session. Having detailed buffer space $30_{HC}$, a comparable arrangement may be appreciated with respect to buffer $30_{LC}$, although with respect to its low class packet space. By way of example, buffer $30_{LC}$ is shown to include virtual space regions $VS_{LC0}$, $VS_{LC1}$, $VS_{LC2}$ and $VS_{LC3}$, where here therefore there are four regions as opposed to three for buffer $30_{HC}$, and for buffer $30_{LC}$ each such region corresponds to a different session of low class packets.

From the preceding, one skilled in the art should appreciate that each virtual space region in buffers $30_{HC}$ and $30_{LC}$ is referred to as a "virtual" space because it represents a logically apportioned amount of the entire storage in the respective buffer, where that logical area may be changed at various times so as to accommodate a different number of packets for the corresponding class and session, as will be further evident later. Further, at the top of each virtual space region is indicated, by a dashed line, a respective threshold. For example, in virtual space region $VS_{HC0}$ of buffer $30_{HC}$, it has a corresponding threshold $THR_{HC0}$. This threshold, as well as the threshold for each other virtual space region in buffers $30_{HC}$ and $30_{LC}$, are monitored by controller 32. Also in the preferred embodiment, each such threshold is determined by controller 32 and may represent a different percentage of the overall space in buffer $30_{HC}$, as compared to the apportionment of the threshold for any other virtual space region in buffers $30_{HC}$ and $30_{LC}$. In any event, therefore, the threshold for a session region in effect provides a nominal boundary of that region, that is, it is anticipated that packets of that session can be accommodated in the region, and as detailed later, if the threshold is exceeded then the session is considered aggressive in that it has exceeded its anticipated needed buffering. Additionally, note that each of buffers $30_{HC}$ and $30_{LC}$ has an associated global threshold $GTHR_{HC}$ and $GTHR_{LC}$, respectively. The term global is used to suggest that this threshold corresponds to the buffer as a whole, as opposed to the individual thresholds that correspond to each respective virtual space region (e.g., threshold $THR_{HC2}$ for virtual space region $VS_{HC2}$, $THR_{HC1}$ for virtual space region $VS_{HC1}$, and so forth). As further discussed below, each global threshold $GTHR_{HC}$ and $GTHR_{LC}$ is set such that if that threshold is exceeded, based on the combination of all space regions occupied by valid packets in the corresponding buffer, then the preferred embodiment interprets such an event as a first indicator of potential traffic congestion for the class of packets stored in that buffer. Laslty, note that node $MN_x$ also includes a server 34. In the preferred embodiment, controller 32 is operable at the appropriate timing to read a packet from either buffer $30_{HC}$ or buffer $30_{LC}$ and the packet then passes to server 34; in response, server 34 outputs the packet to a downstream link $34_L$. Accordingly, the output packet may then proceed from downstream link $34_L$ to another node, either within or external from system 10. In this same manner, therefore, additional packets over time may be output from each of buffers $30_{HC}$ and $30_{LC}$ to downstream nodes, thereby also freeing up space in each of those buffers to store newly-received upstream packets.

FIG. 4 further illustrates the operation of node $MN_x$ of FIG. 3 through the use of a flow chart depicting a method 40. Thus, the steps of method 40 are understood to be performed by the various structure illustrated in FIG. 3, as is now detailed. Method 40 begins with a step 42, indicating the receipt of a packet; thus, step 42 represents a wait state by node $MN_x$ as it awaits receipt of an upstream packet. When such a packet arrives, method 40 continues from step 42 to step 44.

In step 44, node $MN_x$ directs the flow of method 40 based on the Metro class of the packet received in the immediately-preceding step 42, where recall that this class information is available from class field $20_3$ as shown in FIG. 2. Further, and as mentioned above, one preferred embodiment contemplates only two different Metro classes; thus, consistent with that example, step 44 demonstrates alternative flows in two respective directions. Specifically, if step 44 detects a high class packet, then the flow continues to step $46_H$ in which case node $MN_x$ is controlled to handle the packet in connection with the high class packet buffer $30_{HC}$. Alternatively, if step 44 detects a low class packet, then the flow continues to step $46_L$ in which case node $MN_x$ is controlled to handle the packet in connection with the low class packet buffer $30_{LC}$. After either of steps $46_H$ or $46_L$, method 40 continues to step 48.

In step 48, node $MN_x$ stores the packet at issue in the appropriate virtual space region of the buffer to which the packet was directed from step 44. Recall that each virtual space in each of buffers $30_{HC}$ and $30_{LC}$ corresponds to a particular session; thus, step 48 represents the storage of the packet, based on its session, into the corresponding virtual space, provided there is vacant space available in that virtual space region. As a first example and referring to Table 2, suppose a high class packet is received by node $MN_x$ with a Metro ingress node of $ME_0$ and a Metro egress node of $ME_1$, where recall these two node addresses are identifiable from fields $20_1$ and $20_2$, respectively, as shown in FIG. 2. As such, in step 48 this first example packet is stored in virtual space region $VS_{HC0}$, provided there is vacant space available in that virtual space region. As a second example and also referring to Table 2, suppose a high class packet is received by node $MN_x$ with a Metro ingress node of $ME_1$ and a Metro egress node of $ME_2$; consequently, in step 48 this second example packet is stored in virtual space region $VS_{HC1}$, again, provided there is vacant space available in that virtual space region. Additional examples will be ascertainable by one skilled in the art, and note also that such packet storage may be achieved also into buffer $30_{LC}$ and the virtual space regions therein. In another aspect of the preferred embodiment, however, if the virtual space region for the received packet is fully occupied, then the packet is stored in another virtual space region. In this case, the total packet occupancy of the former virtual space region is increased, and is considered to have exceeded its virtual threshold. The total packet occupancy of the latter virtual space region however is not incremented, as the packet that occupies its region does not actually belong to its virtual space. Thus, there is flexibility to service a received packet even in instances when the virtual space region, corresponding to the packet Metro source and destination, is full. Lastly, if upon receipt of the packet there is no corresponding virtual space yet established in a buffer and corresponding to that packet's session (i.e., ingress and egress nodes), then step 48 also establishes such a virtual space and then stores the packet therein. Following the packet storage of step 48, method 40 continues to step 50.

In step 50, node $MN_x$ determines whether the buffer into which the packet was just stored has now reached its corresponding global threshold, where recall those thresholds are GTHRHC for buffer $30_{HC}$ and $GTHR_{LC}$ for buffer $30_{LC}$. Thus, at the time of storing that packet, step 50 in effect determines whether that packet has now caused the buffer, in its entirety (i.e., including all packets from all virtual space regions), to exceed its respective global threshold. Thus, if the packet was stored into the high class packet buffer $30_{HC}$, then step 50 determines whether the total number of valid packets then stored in that buffer exceed the global threshold $GTHR_{HC}$, and similarly if the packet was stored into the low class packet buffer $30_{LC}$, then step 50 determines whether the total number of valid packets then stored in that buffer exceed the global threshold $GTHR_{LC}$. As indicated earlier, if such a threshold is exceeded, then the preferred embodiment interprets such an event as an indicator of potential traffic congestion for the class of packets stored in that buffer, where this action is now shown to occur first in connection with step 50. Toward this end, if the relevant global threshold is exceeded, then method 40 continues from step 50 to step 52. To the contrary, if the relevant global threshold is not exceeded, then method 40 returns from step 50 to step 42 to await receipt of the next packet. Lastly, note that while method 40 illustrates the analysis of step 50 as occurring for each stored packet, in an alternative embodiment this analysis may be performed at other times, such as after receiving and storing multiple packets or based on other resource and or time considerations.

In step 52, node $MN_x$ determines which packet occupancy or session within the congested buffer has exceeded its respective threshold for its respective virtual space region. Again, this step may occur each time following the storage of a packet in a buffer, and preferably step 52 is repeated for all virtual space regions within the congested buffer. Further, recall that during the operation of node $MN_x$ to receive packets according to method 40, at the same time server 34 is servicing packets in buffers $30_{HC}$ and $30_{LC}$ such that the serviced packets are being output to downstream link $34_L$ so as to reach another downstream node. Thus, this operation also may affect the extent to which any virtual space region is filled with valid packets. In any event and by way of example for step 52, with respect to buffer $30_{HC}$, node $MN_x$ determines whether the stored valid packets in virtual space region $VS_{HC0}$ exceeds $THR_{HC0}$, and it determines whether the stored valid packets in virtual space region $VS_{HC1}$ exceeds $THR_{HC1}$, and it determines whether the stored valid packets in virtual space region $VS_{HC2}$ exceed $THR_{HC2}$. Once the packet occupancy of a virtual space region (or more than one such region) that exceeds its respective threshold is found, method 40 continues from step 52 to step 54. Note also in this regard that any session within the congested buffer that is causing the threshold in its corresponding virtual space region to be exceeded is considered an aggressive session in the present context, that is, it is considered a cause of potential congestion at node $MN_x$ because it is seeking to exceed its allotted space (or the threshold within that space), and this condition is detected by node $MN_x$ after it detects that its buffer $30_{HC}$ or $30_{LC}$ in its entirety has exceeded its corresponding global threshold. Lastly, therefore, for sake of an example to be used below, assume that step 52 is reached following receipt of a packet in virtual space region $VS_{HC0}$, and using also the example of Table 2 therefore this packet is from ingress node $ME_0$ and is passing to (or has reached) egress node $ME_1$. Assume also that upon receipt of this packet, the threshold $THR_{HC0}$ is exceeded upon storage of that packet into virtual space region $VS_{HC0}$.

In step 54, node $MN_x$ transmits what will be referred to herein as a pause message to each upstream adjacent node, that is, to each node that is immediately connected to node $MN_x$ in the upstream direction, where due to their connections therefore such nodes have the ability to communicate packets downstream to node $MN_x$. Note that under IEEE 802.3x, a type of pause message is known and that a node under that standard sends pause messages to all adjacent upstream nodes; in response all of those nodes are thereby directed to cease communicating all packets downstream to the node that communicated the pause message. In contrast, however, in the preferred embodiment, when step 54 issues the pause message, it takes a form such as message 60 shown in FIG. 5, and preferably includes the following information. Message 60 includes a pause message identifier field $60_1$, which indicates to a node receiving message 60 that the message is a pause message. Message 60 also includes a session identifier field $60_2$; this field $60_2$ indicates both the Metro ingress and egress addresses of the aggressive session detected by node $MN_x$, that is, it identifies the session that exceeded the threshold in its respective virtual space region. Message 60 also includes a traffic class field $60_3$, which thereby identifies the class of the aggressive section. Lastly, message 60 includes a pause time field $60_4$, where the pause time indicates the amount of time one or more upstream nodes should cease transmitting certain packets to node $MN_x$, which issued pause message 60. In the preferred embodiment, the length of the pause time in field $60_4$, as determined by node $MN_x$, is proportional to the amount of packets the aggressive session has exceeded its virtual space region. Various of these aspects also may be appreciated based on the earlier example; in that case, assume that the system detects buffer $30_{HC}$ as congested and it also discovers that the aggressive session is the one that occupies virtual space region $VS_{HC0}$. Also, assume that the total packet occupancy of the aggressive session is $P_{HC0}$. The preferred embodiment then evaluates the amount of packet, E, that has exceeded its corresponding allocated virtual space or threshold limit; (i.e., $E=P_{HC0}-THR_{HC0}$), and assume that E is measured in bits. Once E is acquired, the preferred embodiment then determines the time, $T_S$, to serve the E amount of packets; ($T_S=E/Rate_{HC}$), where $Rate_{HC}$ is the serving rate of high-class traffic. The preferred embodiment also determines the time, $T_{UP}$, for the pause message to be transmitted and delivered to the upstream node; ($T_{UP}=T_M-T_P$), where $T_M$ is the time to generate a pause message, and $T_p$ is the time it takes to propagate to the upstream node. In addition to that, the preferred embodiment determines if the aggressive session itself is currently being subjected to pause action by the downstream node. If it is, assume that $T_{DWN}$ is the remaining pause time applied onto the aggressive session by the downstream node. From all the information, the preferred embodiment evaluates the amount of time, $T_{PAUSE}$ required to pause the aggressive session at the upstream node; ($T_{PAUSE}=T_S+T_{UP}+T_{DWN}$). This pause time, $T_{PAUSE}$, is then mapped onto the pause time field 604. In one aspect of the preferred embodiment, however, not all adjacent upstream nodes are commanded to cease transmitting packets for the pause time in field $60_4$; instead, each such adjacent upstream node is only commanded to cease transmitting packets, for the aggressive session and in the specified class, for the duration of the pause time in field $60_4$. Thus, the adjacent upstream nodes may still communicate other packets for other sessions to node $MN_x$. As an illustration, recall above the stated example wherein step 52 receives a high class packet from a session with ingress node $ME_0$ and egress node $ME_1$ and assume $THR_{HC0}$ is exceeded upon storage of that packet into virtual space region $VS_{HC0}$. As a result, node $MN_x$ transmits a pause message in the form of message 60 to each adjacent upstream Metro node. In response, for the duration of the pause time in field $60_4$ of the pause message, each of those Metro nodes is prohibited from transmitting a high class packet with ingress node $ME_0$ and egress node $ME_1$ to node $MN_x$; however, during that same duration of the pause time in field $60_4$, each of those adjacent upstream Metro nodes are free to communicate packets of other sessions and also classes to node $MN_x$, assuming that such nodes have not or do not in the interim receive additional pause messages directed to such other packets.

From the above illustrations and description, one skilled in the art should appreciate that the preferred embodiments provide a Metro Ethernet network with nodes functioning to detect a threshold-exceeding buffer and aggressive sessions therein, and to issue pause messages to upstream nodes in response thereto. Further in this regard, note that if an upstream node receives a pause message directed to a particular class and session, it will cease transmitting packets from that class and session toward the detecting node; this cessation may cause the upstream node itself to fill its own buffer beyond the buffer's global threshold, whereby that upstream node also will determine for its own buffer the aggressive session(s) and issue pause messages still further upstream. In this manner, other nodes can become aware of and be controlled with respect to the aggressive session(s), thereby regulating the service of those sessions until they become less aggressive, that is, until the supply of packets for such sessions falls below the tolerance as established by the virtual space threshold of the various detecting nodes. The preferred embodiments also provide various benefits over the prior art. For example, unlike the current standard IEEE 802.3x, the preferred embodiment only pauses Metro sessions that contribute to the state of congestion. Further, the amount of paused time is proportional to the aggressive session's level of aggressiveness, that is, traffic that is more aggressive is paused a longer time duration than less aggressive traffic, thereby distributing network resources in a more equitable manner. As another benefit in contrast to the prior art, under the preferred embodiment, a node issuing a pause message can still receive other traffic (i.e., non-aggressive traffic) from adjacent upstream nodes. As still another benefit, unlike the above-referenced "Selective Backpressure in Switched Ethernet LANs," the preferred embodiment preferably implements a single buffer to monitor and control each session of similar class and the portioning of different virtual space regions within that buffer are preferably altered over time, thereby also leading to reduced hardware modification and cost. As another benefit, unlike the above-referenced documents "A Simple Technique That Prevents Packet Loss and Deadlocks in Gigabit Ethernet" and "Prevention of Deadlocks and Livelocks in Lossless, Backpressure Packet Networks", in the preferred embodiment each session has an allocated virtual buffer space which is evaluated based on the session's evaluated share of bandwidth, and given that the spaces are virtual then the allocation of that space is non-rigid. Indeed, such allocation can be altered according to the traffic and network condition. Further, if a virtual space region is not filled by a session, it can be occupied by packets from one or more other sessions. Hence, buffer space can always be efficiently and fairly utilized. Also in contrast to these last two documents, in the preferred embodiment congestion is triggered only when the packet occupancy exceeds the buffer global threshold. Therefore, the scheme is an extension to the standard IEEE802.3x, but the amount of backpressure given to an aggressive session is proportional to the number of packets the session has exceeded its allocated segment limit. Finally, while the present embodiments have been described in detail, various substitutions, modifications or alterations could be made to the descriptions set forth above without departing from the inventive scope. For example, while the illustrated embodiment depicts virtual space regions in two classes, in an alternative embodiment some classes may exist with a respective buffer as shown, yet that buffer may not be separated into virtual space regions, that is, all packets for that class are merely stored in the buffer; this approach may co-exist with one or more other buffers that are separated into virtual space regions with the sending of a pause message when the separated buffer reaches its global threshold and one more of the virtual space regions also reaches its respective threshold. As another example in an another embodiment, since multiple spanning trees can be available for a VLAN traffic, each of the Ethernet frames is augmented with a spanning tree id (ST-id). Other examples may be ascertained by one skilled in the art. Thus, these examples as well as the preceding teachings further demonstrate the inventive scope, as is defined by the following claims.

The invention claimed is:

1. A network system, comprising:
    a first network node, comprising:
        an input for receiving a packet;
        a buffer, coupled to the input and for storing the packet;
        circuitry for designating a plurality of virtual space regions in the buffer, wherein each one of said virtual space regions serves a respective packet communicating session;
        circuitry for detecting packet congestion in at least one congested virtual space region in the plurality of virtual space regions, wherein said detecting includes detecting when a number of packets stored in said one congested virtual space region exceeds a region threshold corresponding to said one congested virtual space region; and
        circuitry, responsive to a detection by the circuitry for detecting that the number of packets stored in said one congested virtual space region exceeds the region threshold, for issuing a pause message along an output to at least a second network node;
    wherein the pause message indicates a message ingress address and a message egress address, the message ingress address and the message egress address corresponding to a network ingress address and a network egress address in a congestion-causing packet received by the first network node and wherein the network ingress address and the network egress address correspond to the session served by said one congested virtual space region such that the pause message indicates a single network ingress address and a single network egress address corresponding to said one congested virtual space region; and
    wherein the pause message commands the second network node to discontinue, for a period of time, transmitting to the first network node any packets that have the message ingress address and the message egress address thereby temporarily interrupting transmission of any packets corresponding to the session served by said one congested virtual space region.

2. The system of claim 1:
    wherein the buffer storage threshold represents a global threshold indicating a packet occupancy for all packets in all of the plurality of virtual space regions; and
    wherein the circuitry for issuing the pause message is further responsive to issuing the pause message in response to detection of the at least one congested virtual space region.

3. The system of claim 2 wherein the pause message indicates the period of time.

4. The system of claim 3 wherein the first network node further comprises circuitry for determining the period of time in response to an amount of a number of packets in the buffer and exceeding the region threshold of the at least one congested virtual space region.

5. The system of claim 4:
wherein the buffer comprises a first buffer;
wherein the first network node further comprises a second buffer;
wherein the first buffer is for storing a first class of packets; and
wherein the second buffer is for storing a second class of packets different from the first class of packets.

6. The system of claim 5 wherein the second buffer is not divided into a plurality of virtual space regions.

7. The system of claim 5 wherein the circuitry for designating is further for designating a plurality of virtual space regions in the second buffer.

8. The system of claim 7:
wherein the circuitry for detecting is further for detecting when a number of packets stored in the first buffer exceeds a first buffer storage threshold;
wherein the circuitry for detecting is further for detecting when a number of packets stored in the second buffer exceeds a second buffer storage threshold; and
wherein the circuitry for issuing a pause message along an output to at least a second network node is further responsive to detection by the circuitry for detecting that the number of packets stored in the second buffer exceeds the second buffer storage threshold.

9. The system of claim 8 and further comprising the second network node.

10. The system of claim 8 wherein the second network node is directly-connected to the first network node.

11. The system of claim 1 wherein the network node comprises a Metro Ethernet network node.

12. The system of claim 1 wherein the first network node comprises an edge node in a Metro Ethernet network and has a Metro Ethernet network address, and further comprising circuitry for coupling the packet to additional information, the additional information comprising the Metro Ethernet network address of the edge node.

13. The system of claim 12:
wherein the Metro Ethernet network address of the edge node comprises an ingress address relative to the Metro Ethernet network; and
wherein the additional information further comprises an egress Metro Ethernet network address relative to the Metro Ethernet network.

14. The system of claim 1:
and further comprising a plurality of network nodes;
wherein the plurality of network nodes comprise the first network node; and
wherein each network node in the plurality of network nodes comprises:
an input for receiving a packet;
a buffer, coupled to the input and for storing the packet;
circuitry for designating a plurality of virtual space regions in the buffer, of each one of said network nodes, wherein each one of said virtual space regions serves a respective packet communicating session;
circuitry for detecting packet congestion in at least one congested virtual space region in the plurality of virtual space regions of one of said plurality of network nodes, wherein said detecting includes detecting when a number of packets stored in said one congested virtual space region exceeds a region threshold corresponding to said one congested virtual space region; and
circuitry, responsive to a detection by the circuitry for detecting that the number of packets stored in said one congested virtual space region exceeds the region threshold, for issuing a pause message along an output to a different network node in the plurality of network nodes;
wherein the pause message indicates a message ingress address and a message egress address, the message ingress address and the message egress address corresponding to a network ingress address and a network egress address in a congestion-causing packet received by the first network node and wherein the network ingress address and the network egress address correspond to the session served by said one congested virtual space region such that the pause message indicates a single network ingress address and a single network egress address corresponding to said one congested virtual space region; and
wherein the pause message commands the different network node to discontinue, for a period of time, transmitting to the first network node any packets that have the message ingress address and the message egress address thereby temporarily interrupting transmission of any packets corresponding to the session served by said one congested virtual space region.

15. A method of operating a network system, comprising:
at a first network node, the steps of:
designating a plurality of virtual space regions in a buffer, wherein each one of said virtual space regions serves a respective packet communicating session and wherein the buffer is coupled to an input;
receiving a plurality of packets at the input;
storing the plurality of packets in one of said virtual space regions;
detecting packet congestion in at least one congested virtual space region in the plurality of virtual space regions, wherein said detecting includes detecting when a number of packets stored in said one congested virtual space region exceeds a region threshold corresponding to said one congested virtual space region; and
responsive to detection by the detection step that the number of packets stored in the buffer exceeds the region threshold, issuing a pause message along an output to at least a second network node;
wherein the pause message indicates a message ingress address and a message egress address, the message ingress address and the message egress address corresponding to a network ingress address and a network egress address in a congestion-causing packet received by the first network node and wherein the network ingress address and the network egress address correspond to the session served by said one congested virtual space region such that the pause message indicates a single network ingress address and a single network egress address corresponding to said one congested virtual space region; and
wherein the pause message commands the second network node to discontinue, for a period of time, transmitting to the first network node any packets that have the message ingress address and the message egress address thereby temporarily interrupting transmission of any packets corresponding to the session served by said one congested virtual space region.

* * * * *